United States Patent
Chen et al.

(10) Patent No.: US 11,720,345 B2
(45) Date of Patent: Aug. 8, 2023

(54) PULL BASED INNER-LOOP CODE DEPLOYMENT

(71) Applicant: RED HAT, INC., Raleigh, NC (US)

(72) Inventors: Huamin Chen, Westboro, MA (US); Roland Ludwig Huss, Bavaria (DE)

(73) Assignee: Red Hat, Inc., Raleigh, NC (US)

( * ) Notice: Subject to any disclaimer, the term of this patent is extended or adjusted under 35 U.S.C. 154(b) by 53 days.

(21) Appl. No.: 17/153,534

(22) Filed: Jan. 20, 2021

(65) Prior Publication Data

US 2022/0229659 A1 Jul. 21, 2022

(51) Int. Cl.
*G06F 8/656* (2018.01)
*G06F 11/10* (2006.01)

(52) U.S. Cl.
CPC .......... *G06F 8/656* (2018.02); *G06F 11/1004* (2013.01)

(58) Field of Classification Search
CPC ......... G06F 8/65; G06F 8/656; G06F 11/1004
USPC ........................................................ 717/168
See application file for complete search history.

(56) References Cited

U.S. PATENT DOCUMENTS

| | | | | |
|---|---|---|---|---|
| 7,275,251 B2* | 9/2007 | Gitelson | ............... | G06F 9/4843 719/331 |
| 8,046,696 B2* | 10/2011 | Bales | ................. | G06F 8/38 715/825 |
| 8,418,168 B2* | 4/2013 | Tyhurst | ............... | G06F 8/65 717/173 |
| 9,645,808 B1* | 5/2017 | Turpie | ................ | G06F 11/3672 |
| 10,212,246 B2 | 2/2019 | Cohen et al. | | |
| 10,572,245 B1* | 2/2020 | Doebel | ..................... | G06F 8/65 |
| 11,093,321 B1* | 8/2021 | Zeavelou | ............ | G06F 11/0793 |
| 11,175,899 B2* | 11/2021 | Kalaskar | ................... | G06F 8/65 |
| 11,301,280 B2* | 4/2022 | Kandula | ............... | G06F 9/4406 |
| 2007/0118530 A1* | 5/2007 | Chow | ........................ | G06F 8/65 |
| 2012/0078859 A1* | 3/2012 | Vaitheeswaran | ...... | G06F 16/951 707/693 |
| 2013/0159985 A1* | 6/2013 | Gilman | ..................... | G06F 8/65 717/168 |
| 2014/0215452 A1* | 7/2014 | Hicks | ..................... | G06F 8/656 717/172 |
| 2017/0249141 A1* | 8/2017 | Parees | ................. | G06F 11/3668 |
| 2020/0285464 A1* | 9/2020 | Brebner | ............... | G06F 11/362 |
| 2021/0089292 A1* | 3/2021 | Patten, Jr. | ................. | G06F 8/65 |
| 2021/0240730 A1* | 8/2021 | Polisetty | ................ | G06F 16/27 |
| 2021/0248205 A1* | 8/2021 | Tank | .................... | G06F 16/986 |

FOREIGN PATENT DOCUMENTS

CN 108958927 12/2018

OTHER PUBLICATIONS

Title: Decentralized coordination of dynamic software updates in the Internet of Things, author: M Weißbach, published on 2016.*

(Continued)

*Primary Examiner* — Chameli Das
(74) *Attorney, Agent, or Firm* — Womble Bond Dickinson (US) LLP

(57) ABSTRACT

A method includes determining whether a code update for the service is available at a central repository of the computing environment and, in response to determining that the code update is available, retrieving the code update from the central repository. The method further includes performing a modification of the service in view of the code update.

18 Claims, 8 Drawing Sheets

(56) References Cited

OTHER PUBLICATIONS

Title: Improving operating system availability with dynamic update author: A Baumann et al, published on 2004.*
Title: Effectiveness of code contribution: From patch-based to pull-request-based tools, author: J Zhu et al, published on 2016.*
Title: An exploratory study of the pull-based software development model, author: G Gousios et al, published on 2014.*
Title: Container and microservice driven design for cloud infrastructure devops, author: H Kang, published on 2016.*
Title: Distributed systems of microservices using docker and serfnode, author: J Stubbs, published on 2015.*
Benedicic, L et al. (Dec. 2019). "Sarus: Highly Scalable Docker Containers for HPC Systems", pp. 20.

\* cited by examiner

PULL BASED INNER-LOOP CODE DEPLOYMENT

TECHNICAL FIELD

Aspects of the present disclosure relate to high performance computing application development, and more particularly, to pull based inner-loop code deployment for serverless based high performance computing workloads.

BACKGROUND

High performance computing architectures may run a large number of services with large scale parallelism of the services across multiple computing devices. High performance computing may include long running workloads that are resilient to failure with a high demand for processing, network, and storage resources. Serverless architectures may provide for the parallel execution of applications, functions, etc. in a high performance computing environment. The code development and deployment for high performance computing architectures is complex due to a large number of steps required to deploy code changes to many parallel services.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
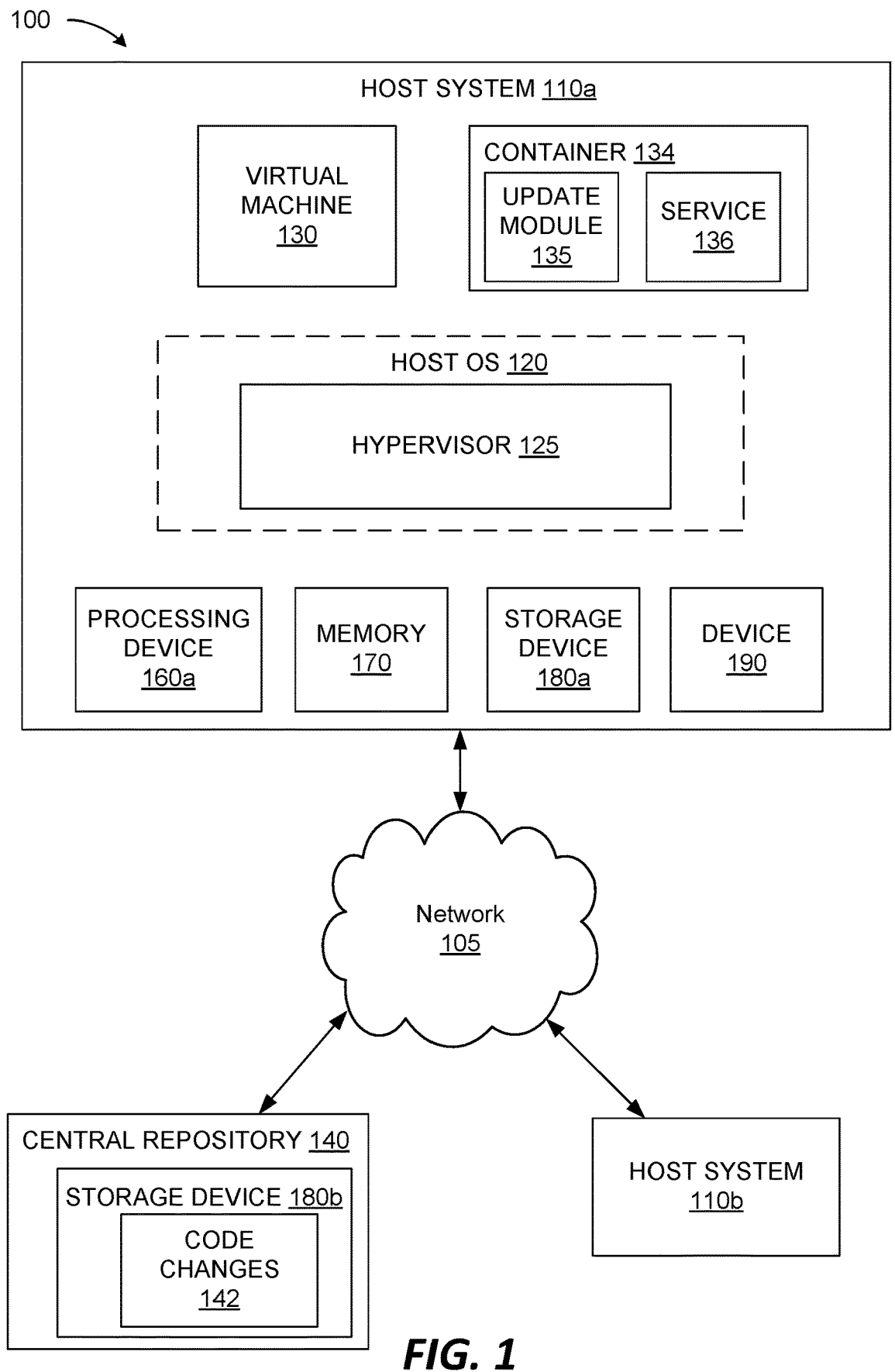
FIG. 1 is a block diagram that illustrates an example computer architecture, in accordance with some embodiments.

In conventional high performance computing architectures, the software development process is decoupled from deployment of the developed code. Therefore, development and deployment of high performance computing applications may take much longer than for other platforms, such as micro-service platforms or other cloud computing platforms. Furthermore, issues in high performance computing applications may take a large amount of time to resolve due to complexity of debugging. A significant level of experience and expertise may be required for development and debugging of high performance computing workloads. Accordingly, the increased complexity increases the development turnaround time and other associated expenses. The conventional development workflow for high performance computing applications includes editing the application source code, compiling the source code, and then deploying the application. After deployment, the application is run and monitored for purposes of debugging and performance monitoring. The time consumed through the iterative process of development is substantially increased for high performance computing applications because the deployment step in the development workflow for high performance computing applications includes many steps and can be very costly. For example, the code changes are pushed to each of the running instances of the application which may require identification or tracking of the location of each instance, providing the code changes to each instance, and restarting each instance.

To decrease deployment time for high performance computing applications, a deployment that is less than full production-grade deployment, such as outer-loop development, may be used. A version upgrade using outer loop development may include a full tear-down of the old version and a full new start with the new version of the application. In embodiments, platforms can use a process referred to as a hot reload which provides for a re-deployment with code updates without restarting the server process on which the application is running. Similarly, in container based platforms, the hot reload mechanism may be used to keep containers live and operating while replacing code parts within the containers. In this manner, a full container image deployment is not needed to completely restart a container for an update. This method of replacing portions of code while the application continues to operate is referred to herein as inner-loop development. In inner-loop development, the changed code is pushed to the running container by copying the code to the running container instance.

However, conventional inner-loop development has several drawbacks in the context of cloud computing, high performance computing, or any other system in which parallel computing is performed. First, in order to push code changes to a container, processing logic needs to be provided access to the container (i.e., location of container and access permissions) which may not be possible due to security constraints of the computing environment (e.g., cluster) and which may necessitate tracking many container instances. For example, when deploying multiple replicas of an application, each application, or container that includes the application, has to be identified and the code changes pushed to each of them. Additionally, in serverless scenarios, it is a common use case to scale-to-zero the running application, to save resources and to scale the application up when a request is received. Using a push based approach for deploying code changes, however, mandates that the application be continuously running so that the code changes can be pushed to the application.

Aspects of the disclosure address the above-noted and other deficiencies by providing for a central repository for pull-based inner-loop code deployment for serverless based high performance computing workloads. During code development and deployment, code updates for a service (e.g., an application, function, micro-service etc.) are pushed to the central repository of a computing system, such as a cloud computing system, computing cluster, or other high performance computing platform. The central repository may then publish the location of the code updates to make the code updates available to all run-time instances of the service that are executing within the computing system. A container for each instance of the service may include processing logic to detect that a code update associated with the service has been pushed to the central code repository. The processing logic in the container for each service instance may then retrieve a copy of the code updates from the central code repository and perform a hot reload of the service instance with the code updates (i.e., the container does not restart).

In one example, the processing logic may determine whether the access location, or the content of the access location of the service code in the central repository has changed in response to a triggering event (e.g., a timer, the service is accessed, etc.). The processing logic may, in response to determining that the central repository includes code updates for the service, download the code updates for the service from the central repository and restart the service without restarting the container. The processing logic may then perform a snapshot on the runtime environment of the service instance to save a rollback state of the service instance if the code updates are rolled back (e.g., if the code updates cause performance or functional regressions with the service). Once the snapshot is performed, the processing logic may overlay the downloaded code changes from the centralized repository over a base image of the service code.

Additionally, processing logic may collect performance metrics of the service instance from both before and after the update. For example, the processing logic may collect performance metrics from before the update and then restart collection of metrics after the update. The processing logic may compare the performance metrics from before the update and after the update to determine whether there are regressions associated with deployment of the new code to the service instance. If a regression is detected, the processing logic may roll back to the prior version using the snapshot of the service instance from prior to the update.

FIG. 1 depicts a high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1.

As shown in FIG. 1, computer system architecture 100 includes host systems 110a, b and central repository 140. The host systems 110a and 110b include one or more processing devices 160a, b, memory 170, which may include volatile memory devices (e.g., random access memory (RAM)), non-volatile memory devices (e.g., flash memory) and/or other types of memory devices, a storage device 180a (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing device 160a, b. It should be noted that although, for simplicity, a single processing device 160a, storage device 180a, and device 190 are depicted in FIG. 1, other embodiments of host systems 110a, b and central repository 140 may each include a plurality of processing devices, storage devices, and devices. The host systems 110a, b and central repository 140 may be a server, a mainframe, a workstation, a personal computer (PC), a mobile phone, a palm-sized computing device, etc. In embodiments, host systems 110a, b and central repository 140 may be separate computing devices. In some embodiments, host systems 110a, b and/or central repository 140 may be implemented by a single computing device. For clarity, some components of central repository 140 and host system 110b are not shown. Furthermore, although computer system architecture 100 is illustrated as having two host systems, embodiments of the disclosure may utilize any number of host systems.

Host system 110a, b may additionally include one or more virtual machines (VMs) 130, containers 134, and host operating system (OS) 120. VM 130 is a software implementation of a machine that executes programs as though it was an actual physical machine. Container 134 acts as isolated execution environments for different functions of applications, as previously described. The VM 130 and/or container 134 may be a serverless function for executing one or more services 136 of a serverless framework. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110a, b, and central repository 140 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110a, b and/or central repository 140.

In some embodiments, storage device 180b may store code changes 142 for a service (e.g., service 136). The code changes 142 may be pushed to the storage device 180b of the central repository 140 from a user device. For example, a developer may write the code change 142 to the service 136 and push (e.g., upload) the code changes 142 to the central repository 140. The service 136 may be associated with an update module 135 to determine that the code changes 142 have been pushed to the central repository 140 and retrieve the code changes 142. For example, update module 135 may determine whether the central repository 140 includes the code changes 142 in response to a triggering event, such as an access of the service 136, a periodic polling timer, or any other event. The update module 135 may download the code changes 142 from the central repository 140 and then update the service 136 using the code changes 142. Further details regarding the central repository 140 and update module 135 will be discussed with respect to FIGS. 2-7 below.

Figure 2:
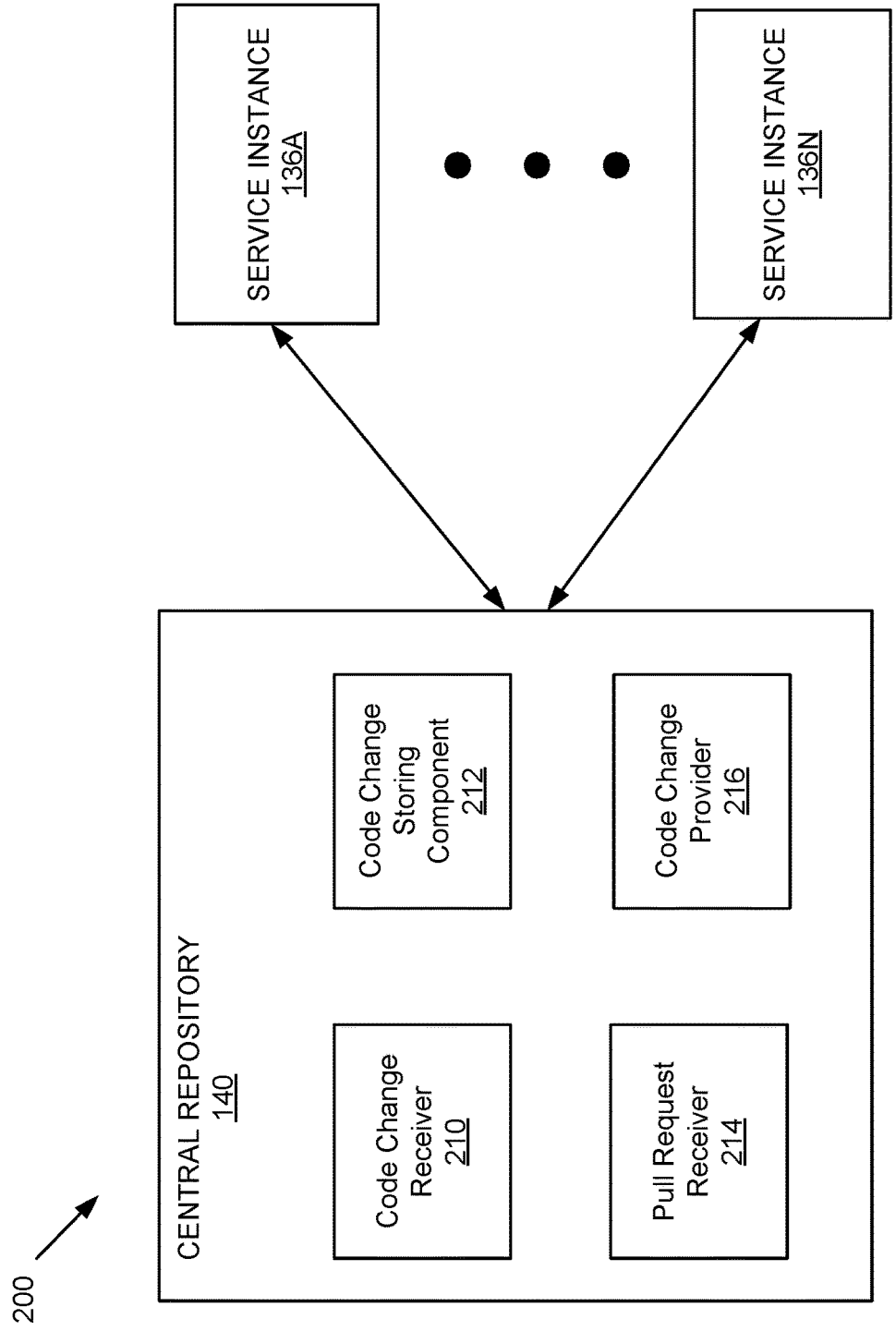
FIG. 2 is an illustration of an example of a central repository for providing pull based code deployment, in accordance with embodiments of the disclosure.

FIG. 2 is a block diagram of an example system 200 including a central repository 140 for pull based inner loop code deployment, in accordance with embodiments of the disclosure. Central repository 140 may store code updates for one or more services (e.g., service 136 of FIG. 1). Code changes may be pushed to the central repository 140 from a user device. For example, a developer may write code changes for a service locally on a user device and upload the code changes to the central repository 140.

The central repository 140 includes processing logic of a processing device (not shown) that may execute a code change receiver 210, a code change storing component 212, a pull request receiver 214, and a code change provider 216. The code change receiver 210 may receive code changes for the service from a client device. For example, the code changes may be updates to the service to be applied to instances of the service running in a computing environment (e.g., in a high performance computing workload).

The code change storing component 212 may store the code changes in the central repository and publish the code changes to be available to each of the service instances 136A-N executing within the computing environment. Code change storing component 212 may store an address of the code changes in the central repository 140, or any other location in the computing system accessible by the service instances 136A-N. For example, the code change storing component 212 may update metadata associated with the central repository 140 or may include the address of the code changes (e.g., a URL) in, for example, a configuration map (configMap) of the computing environment (e.g., cluster).

The pull request receiver 214 may receive a request from each of the service instances 136A-N to retrieve the code changes. For example, each of the service instances 136A-N may request to pull (i.e., download) the code changes from central repository 140. The code change provider 216 may then copy the code changes and provide the code changes to the corresponding requesting service instance 136A-N.

Figure 3:
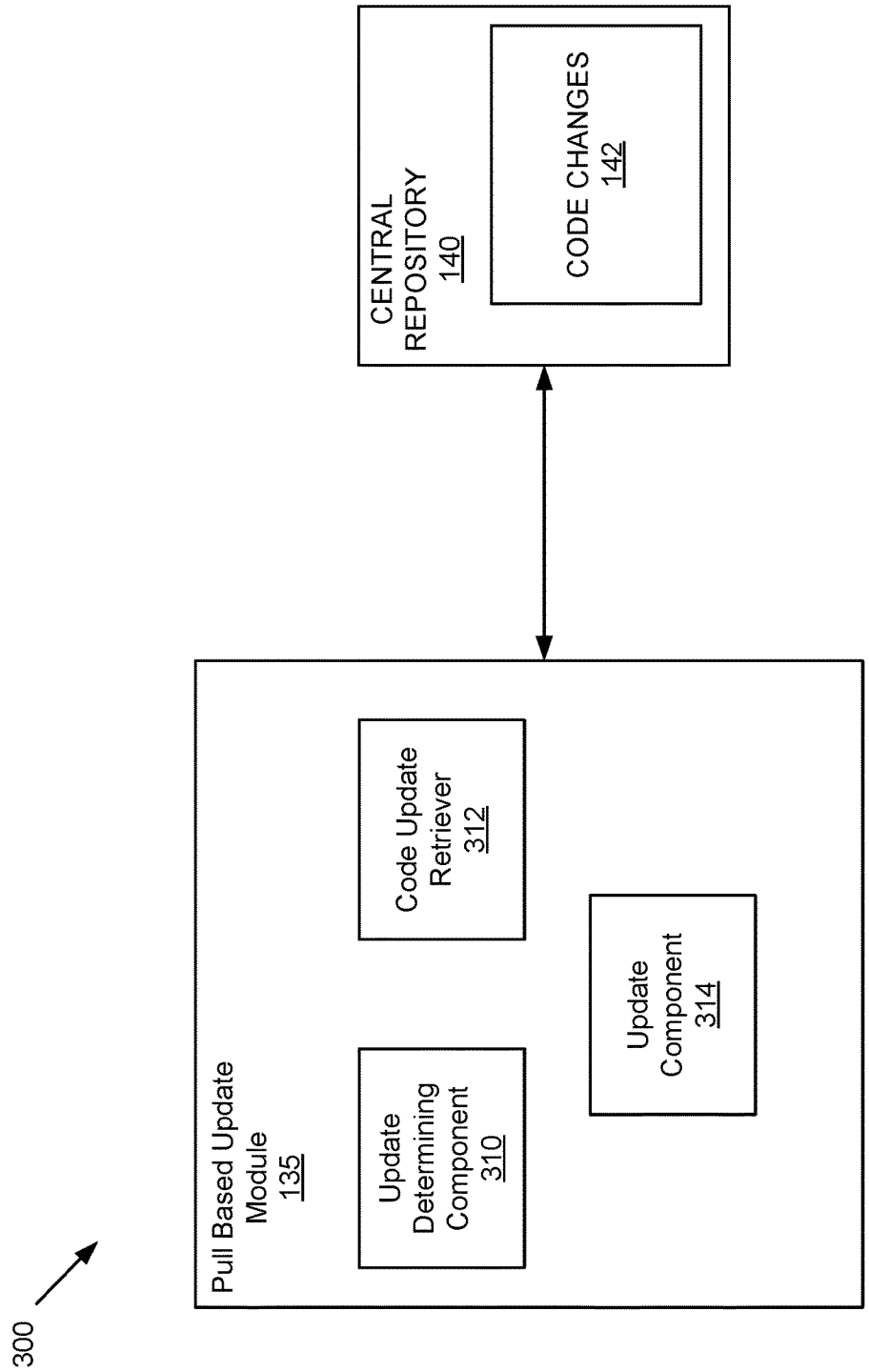
FIG. 3 is an illustration of an example module to perform pull based inner loop deployment of code changes, in accordance with some embodiments.

FIG. 3 is a block diagram of an example system 200 including a pull based update module 135 and a central repository 140 for pull based inner loop code deployment, in accordance with embodiments of the disclosure. The pull based update module 135 may retrieve code changes 142 to a service from the central repository 140 to update one or more instances of the service. The pull based update module 135 may include processing logic of a processing device (not shown) that may execute a code update determining component 310, a code update retrieving component 312, and an update performing component.

The code update determining component 310 may determine whether the central repository 140 includes code changes 142 for the service associated with the pull based update module 135. For example, the pull based update module 135 may be a wrapper (e.g., a container) that includes the service and the code update determining component 310 may determine whether the central repository 140 includes code changes 142 for the service of the container. In one example, to determine whether the central repository 140 includes code changes 142 for the service, the code update determining component 310 may determine a checksum of the code changes 142 at the central repository 140. The code update determining component 310 may compare the checksum to a previous checksum or a local checksum of the code of the instance of the service. If the code update determining component 310 determines that the checksum is different from the previous checksum or the local checksum of the code of the instance, then the code update determining component 310 may determine that code changes have been pushed to the central repository 140.

The code update retrieving component 312 may retrieve the code changes 142 in response to determining, by the code update determining component 310, that code changes for the service have been pushed to the central repository 140. The code update retrieving component 312 may download the code changes 142 from the central repository based on the address of the code changes 142. The update performing component 314 may perform an update of the service instance based on the code changes 142 retrieved from the central repository 140.

Figure 4:
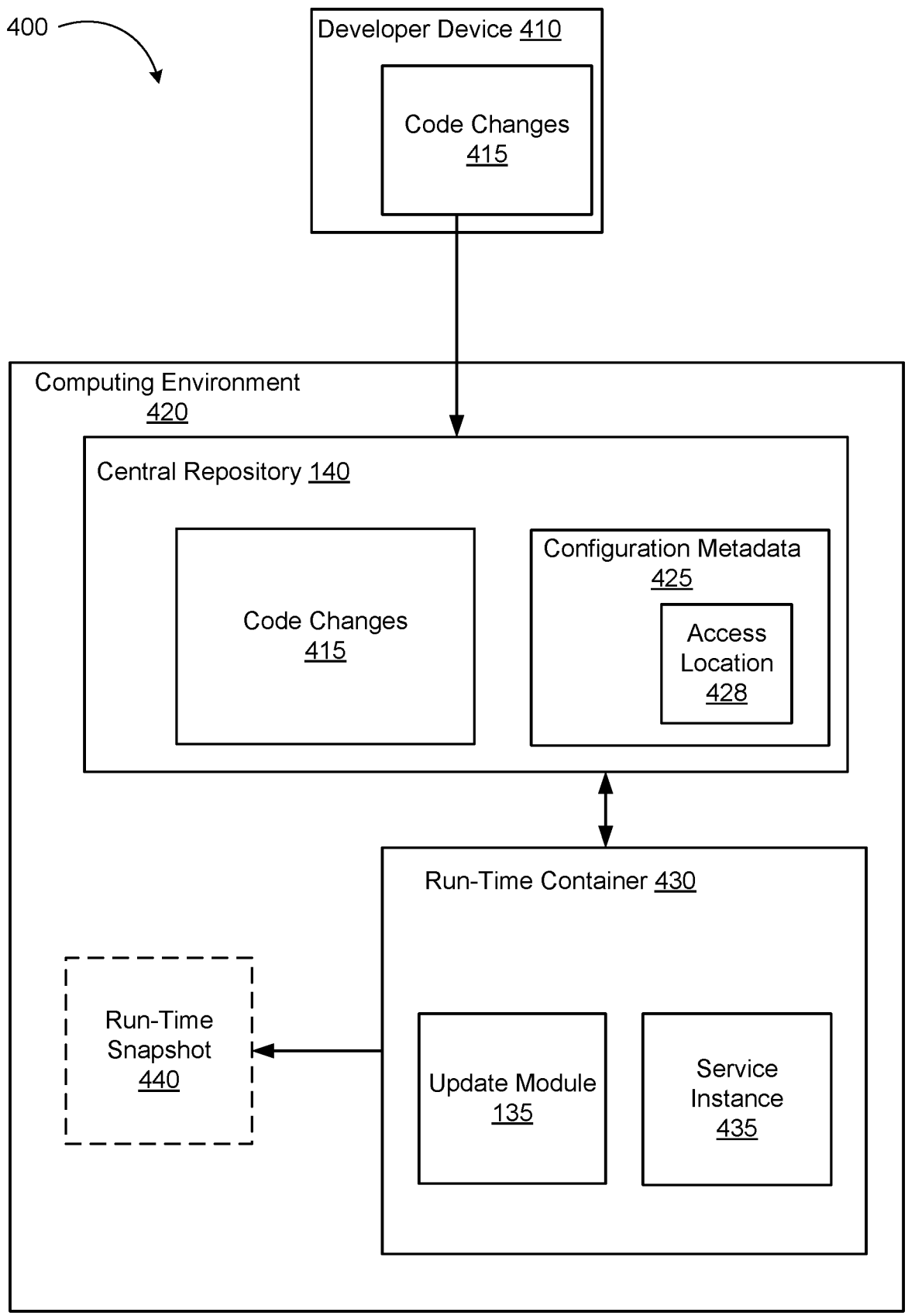
FIG. 4 is an illustration of an example system to perform pull based inner loop deployment of code changes, in accordance with some embodiments.

FIG. 4 is a block diagram of a system 400 for pull based inner loop code deployment. System 400 includes a developer device 410 and computing environment 420. Computing environment 420 includes a central repository 140 and one or more run-time containers 430. The run-time containers 430 may include a service instance 435 and an update module 135.

In one example, a developer using developer device 410 may generate code changes 415 to a service of a serverless workload in computing environment 420. The developer device 410 may push, or upload, the code changes 415 to the central repository 140 of the computing environment 420. Once the code changes 415 have been stored at the central repository 140, the central repository 140 may store an access location 428 of the code changes 415 in configuration metadata 425. Although configuration metadata 425 is depicted within the central repository 140, the configuration metadata 425 may be included in the computing environment 420 separate from, but in communication with, the central repository 140.

In embodiments, the update module 135 may determine whether code changes 415 have been uploaded to the central repository 140 since a previous check of the central repository 140. In one example, the update module 135 may determine whether the code changes 415 have been uploaded in response to an access of the service instance 435, periodically in response to lapse of a timer, or in response to any other trigger. To determine whether code changes for the service have been uploaded to the central repository 140, the update module 135 may check the configuration metadata 425 to determine if a signature of the code changes 415 indicates that code changes 415 has been uploaded to the central repository 140 since the previous check. The signature may be any type of indicator or digest of the code changes 415, such as a checksum, a version, a timestamp, etc. In one example, to determine whether the central repository 140 includes code changes 415 for the service, the update module 135 may determine a checksum of the service code (e.g., code changes 415) at the central repository 140. In one example, the checksum may be included in the configuration metadata 425. The update module 135 may compare the checksum to a previous checksum of the service code at the central repository 140 or a local checksum of the code of the service instance 435. If the update module 135 determines that the checksum of the code changes 415 is different from the previous checksum or the local checksum of the code of the service instance 435, then the update module 135 may determine that code changes have been uploaded to the central repository 140. In another example, the update module 135 may determine whether a time stamp of the code changes 415 is difference from a previous time stamp, indicating that the code changes 415 have been pushed to the central repository since the last check. In yet another example, the update module may compare a version of the service in the code changes 415 against a version of the service instance 435. It should be noted that any other data or metadata of the central repository may be used by the update module 135 that code changes 415 are available to be retrieved from the central repository 140.

If the update module 135 determines that code changes 415 have been uploaded, the update module 135 may retrieve the code changes 415 from the central repository using the access location 428 from the configuration metadata 425. The update module 135 may then update the service instance 435 using the code changes 415 retrieved from the central repository 140. In one example, a run-time snapshot 440 may be generated for the run-time container 430 prior to performing the updates of the service instance 435 to be used for later roll back if performance regressions are detected after the update.

In one example, the update module 135 may perform a hot reload of the service instance 435. A hot reload may be a streamlined update of the service instance 435 that does not require a restart of the server process, the container, or the service instance 435. For example, the update module 135 may be a background daemon, such as supervisord, to perform the code updates to the service instance 435 without restart of the run-time container 430. The hot reload process may be programming language agnostic in which the hot reload does not depend on the programming language of service instance 435. In another example, the hot reload may be dependent on the programming language used by the service instance 435 and the platform on which the service instance 435 is executing.

Figure 5:
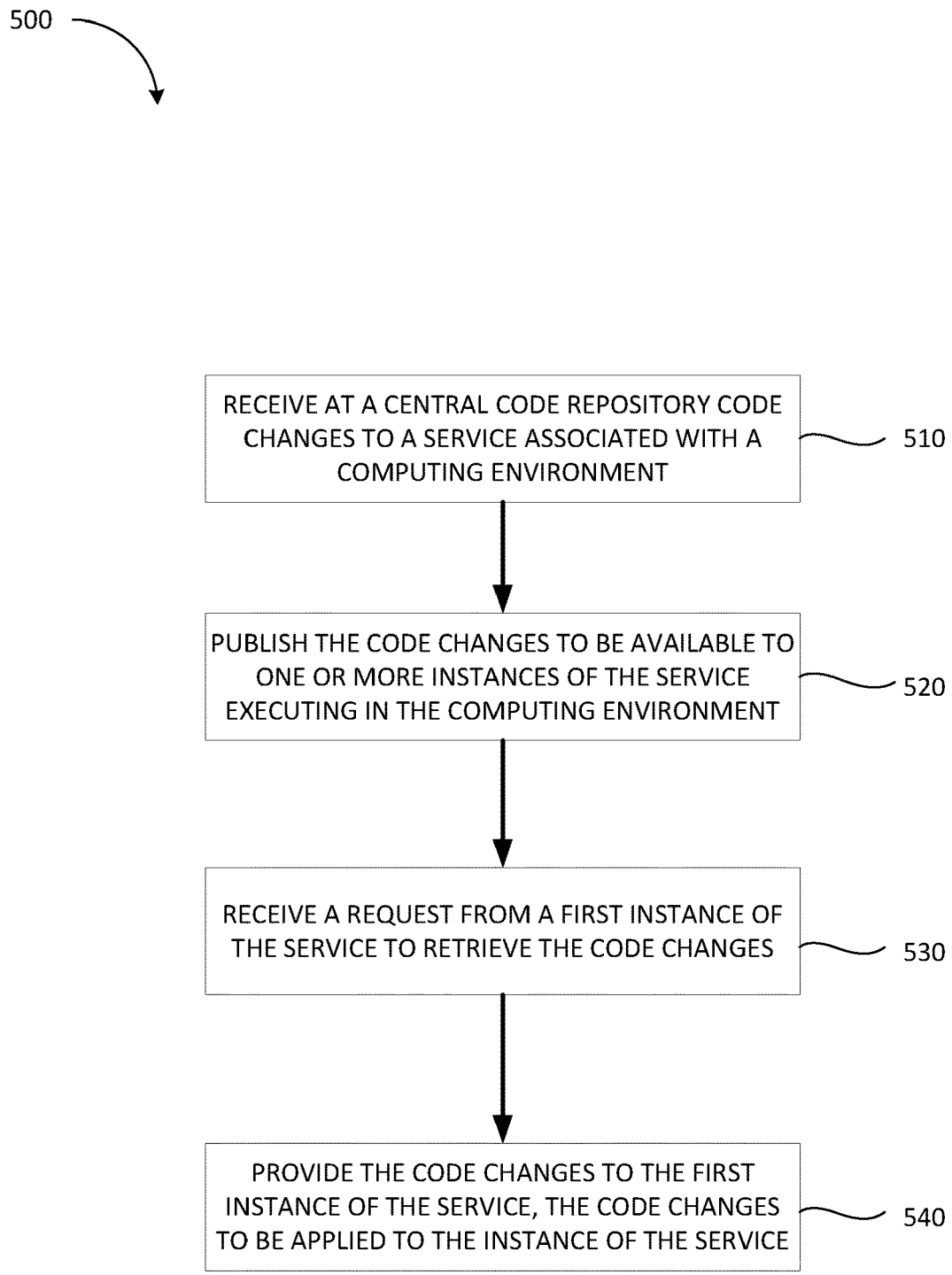
FIG. 5 is a flow diagram of a method of providing code changes in pull based inner loop code deployment, in accordance with some embodiments.

FIG. 5 is a flow diagram of a method 500 of generating scaling heuristics for scaling serverless functions, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by central repository 140 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives, at a central code repository, code changes to a service associated with a computing environment. The code changes may be received from a developer system. For example, a developer of the service may push code changes to the central repository to be applied to all instances of the service to test how the code changes will operate. The computing environment may be a serverless computing environment in which a plurality of separate instances of the service can be instantiated in parallel. For example, each instance of the service may be included in a container (i.e., an isolated execution environment) in the serverless computing environment. In one example, the serverless computing environment may be executing a high performance computing workload.

The service may be an application, a function, a microservice, or any other software service to provide processing, for example for a high performance workload. For example, the service may be one portion of the high performance computing application. Instances of the service may be instantiated in accordance with the needs of a particular workload of the high performance computing application. Accordingly, many instances of the service may be running within the computing environment at one time. The central repository may be a continuously running code repository that is accessible from throughout the computing environment. The central repository may be an http server, a file server, an upload service, a file system, or any other type of repository.

At block 520, the processing logic published the code changes to be available to one or more instances of the service executing in the computing environment. Publishing the code changes may include writing an access location to a configuration map (configMap) associated with the computing environment. For example, the computing environment may include a cluster of host computing devices and the configuration map may include metadata associated with the cluster of computing devices. In another example, the processing logic may write the access location to any metadata accessible by instances of the service running in the computing environment. In one example, the access location may be a uniform resource locator (URL) of the code changes, a pointer to the storage location of the code changes, or any other identifier of the location of the code changes such that instances of the service can determine where to find the code changes.

At block 530, the processing logic receives a request from a first instance of the service to retrieve the code changes. Each instance of the service may request the code changes from the central repository. In one example, each instance is included in a container which may include processing logic to determine that the code change has been pushed to the central repository and to retrieve the code changes. In one example, the request may include the access location of the code changes that was determined by the service, or container of the service, from the metadata associated with the central repository. The processing logic of the central repository may then provide a download of the code changes based on the access location received in the request.

At block 540, the processing logic provides the code changes to the first instance of the service, the code changes to be applied to the instance of the service. In one example, the processing logic identifies the location of the instance of the service and provides the code changes to the instance. The processing logic may provide the code changes to each instance that requests the code changes. Accordingly, the code changes may be distributed to each of the instances of the service executing in the computing environment via pull requests received from each of the instances.

Figure 6:
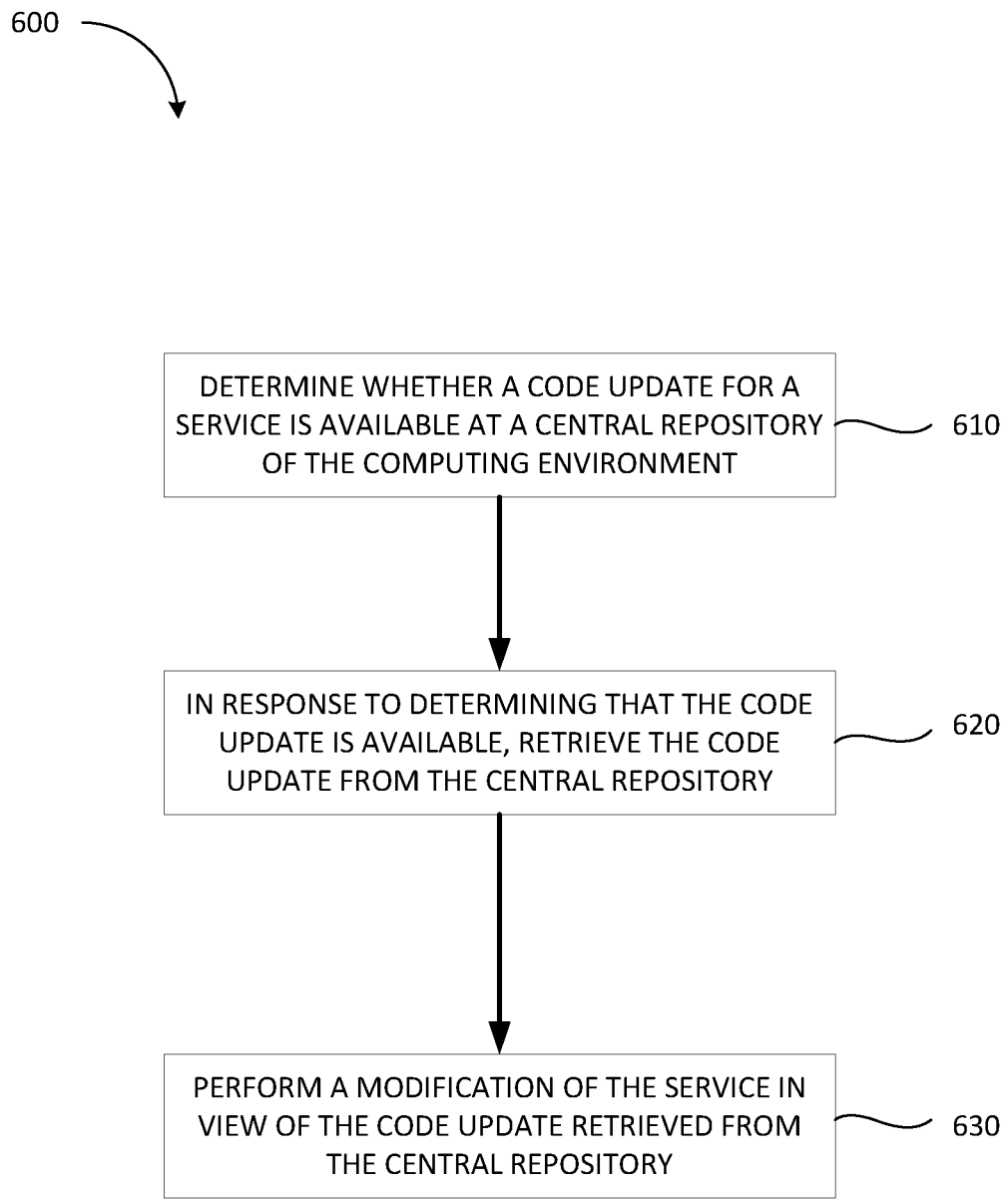
FIG. 6 is a flow diagram of a method of pull based inner loop code deployment, in accordance with some embodiments.

FIG. 6 is a flow diagram of a method 600 of utilizing a threshold to identify a rate of scaling serverless functions, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by update module 135 of container 134 as described in FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where the processing logic determines whether a code update for a service is available at a central repository of the computing environment. The processing logic may be processing logic of a container, or included within a container of an instance of the service. For example, the processing logic may be a software wrapper of an instance of the service, such as a background daemon managing operation of the service. The code update may be an update to the service provided by a developer to be deployed to the computing environment without a complete restart of the computing environment or containers in which the services are running.

In one example, to determine whether the code update for the service is available, the processing logic may either periodically, or in response to a trigger, check whether metadata of the central repository indicates that the code updates are stored at the central repository. For example, to determine whether updates are stored at the central repository, the processing logic may determine whether a signature, which may include any one or more of the access location (e.g., access URL), a checksum, a timestamp, or a version of the code updates, has changed since a previous check. Alternatively, the processing logic may determine whether the signature of the code updates differs from a corresponding signature of the instance of the service. It should be noted that any other indicator at the central repository may indicate that code changes for the service exist in the central repository. For example, a flag may be set to indicate that code changes for the service have been pushed to the central repository. Accordingly, the processing logic can simply check if the flag is set to determine whether there are code changes to be retrieved and applied to the service instance.

At block 620, in response to determining that the code update is available, the processing logic retrieves the code update from the central repository. To retrieve the code update from the central repository, the processing logic may download the code update from the access location of the code update. For example, the processing logic may retrieve the access location of the code update from the metadata indicating that the code update is included in the central repository. The processing logic may then send a request to the central repository to download the code updates from the access location.

At block 630, the processing logic performs a modification of the service in view of the code update retrieved from the central repository. As discussed above, the instance of the service may be included in a container. In one example, to perform the modification, the processing logic may apply the code updates to a local file system of the container. In one example, the processing logic may perform a hot reload of the service instance to reduce the deployment time of the code updates. Any hot reload mechanism may be used to perform the modifications. In one example, the processing logic applies the code updates to the local file system of the container and then restarts the service without restarting the container. In another example, the code updates may be applied to the service while the service continues to operate. For example, the code changes may be applied to the corresponding portions of the service while the other (e.g., unchanged) portions of the service continue to execute. In one example, the hot reload mechanism may be programming language agnostic (i.e., does not depend on the language or platform), while in other examples the reload mechanism may be dependent upon the programming language and the execution platform.

Figure 7:
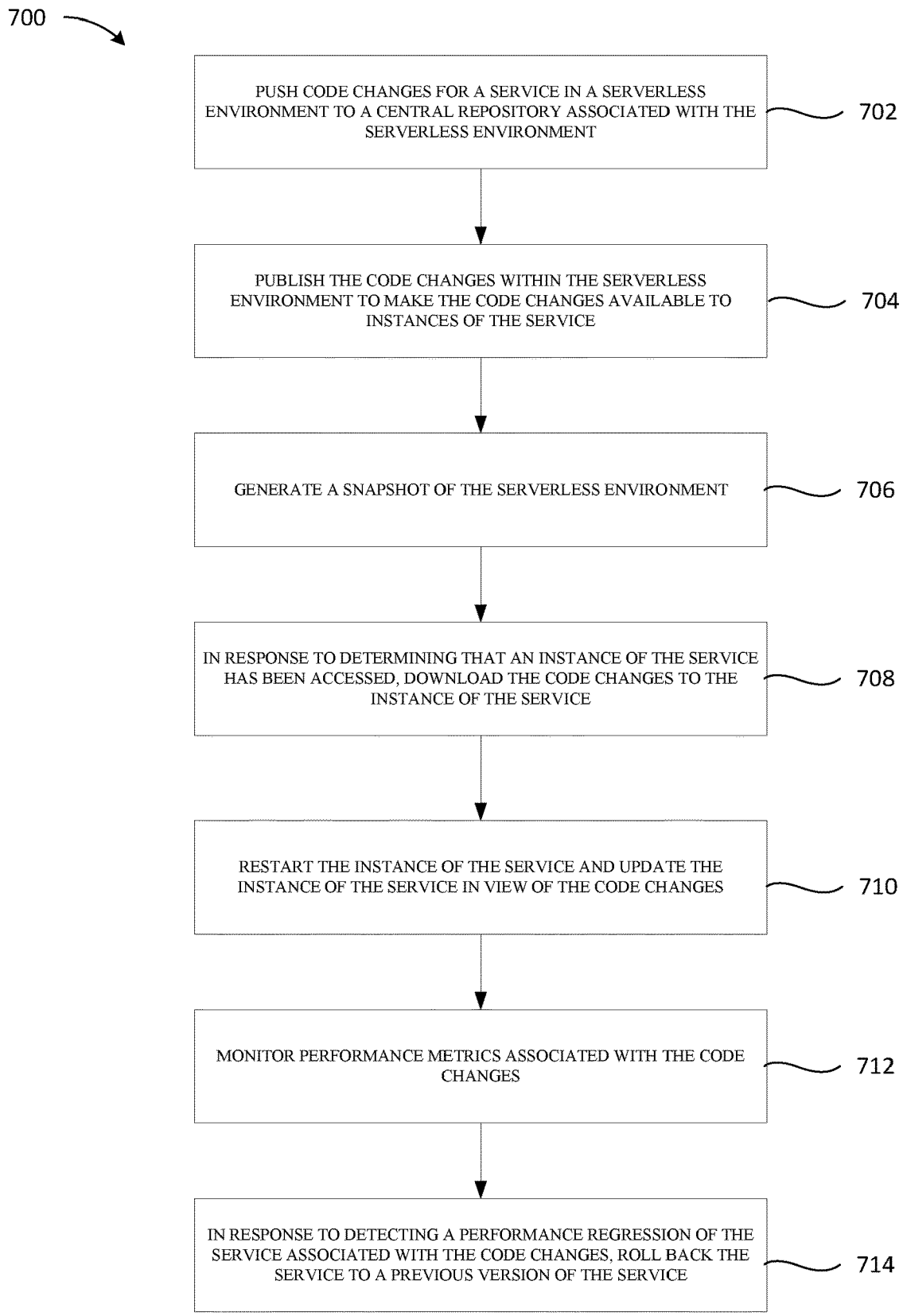
FIG. 7 is a flow diagram of a method of pull based inner loop code deployment, in accordance with some embodiments.

FIG. 7 is a flow diagram of a method 700 of determining maximum idle times for serverless functions, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by update module 135 and/or central repository 140 of FIG. 1.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 702, where the processing logic pushes code changes for a service to in a serverless environment to a central repository associated with the serverless environment. The serverless environment may deploy a high performance computing workload utilizing a large number of instances of the service. The serverless environment may also execute any other workload using any number of parallel instances of the service. The central repository may be a continuously running code repository to receive code changes of services in the serverless environment.

At block 704, the processing logic publishes the code changes within the serverless environment to make the code changes available to instances of the service. The processing logic may store an access location of the code changes as metadata (e.g., configuration data) associated with the serverless environment and the central repository. For example, the serverless environment may include a cluster of host computing devices. The processing logic may thus store the access location in configuration data of the cluster of host computing devices. In one example, the access location may be a uniform resource locator (URL) of the code changes, a pointer to the storage location of the code changes, or any other identifier of the location of the code changes.

At block 706, the processing logic generates a snapshot of the serverless environment. The processing logic may perform a snapshot of the entire serverless environment. In another embodiment, the processing logic may perform a local snapshot of each runtime container of the instances of the service. The snapshot may save a state (e.g., memory, storage, processor state, etc.) of the containers of the serverless environment at the time the snapshot is performed. In another example, the snapshot may store the code of the executing service at the time the snapshot is performed. Accordingly, the state of the service and service instances prior to applying the code changes can be saved for later roll back, if necessary.

At block 708, in response to determining that an instance of the service has been accessed, the processing logic downloads the code changes to the instance of the service. In one example, prior to downloading the code changes, the processing logic may determine whether the central repository includes code changes for the service. For example, the processing logic may determine if metadata associated with the central repository indicates that the central repository includes new code changes that have been pushed to the central repository since the last time the processing logic checked for code changes. The metadata may include a signature of the code changes, such as an access location (e.g., access URL), a checksum, a timestamp, a version, or any other metadata associated with the code changes at the central repository.

In one example, the processing logic may download the changes to a container in which the instance is executing. In another embodiment, the processing logic may be a software wrapper associated with the service to retrieve the code changes, as further discussed below, apply the code changes. In another example, an update module may be included in a container of the service to retrieve and apply the code updates.

At block 710, the processing logic restarts the instance of the service and updates the instance of the service in view of the code changes. In one example, the processing logic applies the code changes to a local file system of a container of the instance of the service. The processing logic may then restart the service within the container without restarting the container. In other embodiments, any hot reload mechanism may be used to apply the code changes to the instance of the service. In one example, after the code changes have been applied to the instance of the service, a snapshot of the instance may be taken and stored in a repository of service versions.

At block 712, the processing logic monitors performance metrics of the service instance associated with the code changes. At block 714, in response to detecting a performance regression of the service associated with the code changes, the processing logic rolls back the service to a previous version of the service. For example, the processing logic may roll back the instance of the service to the state of the service instance at the time of the snapshot performed at block 706.

Figure 8:
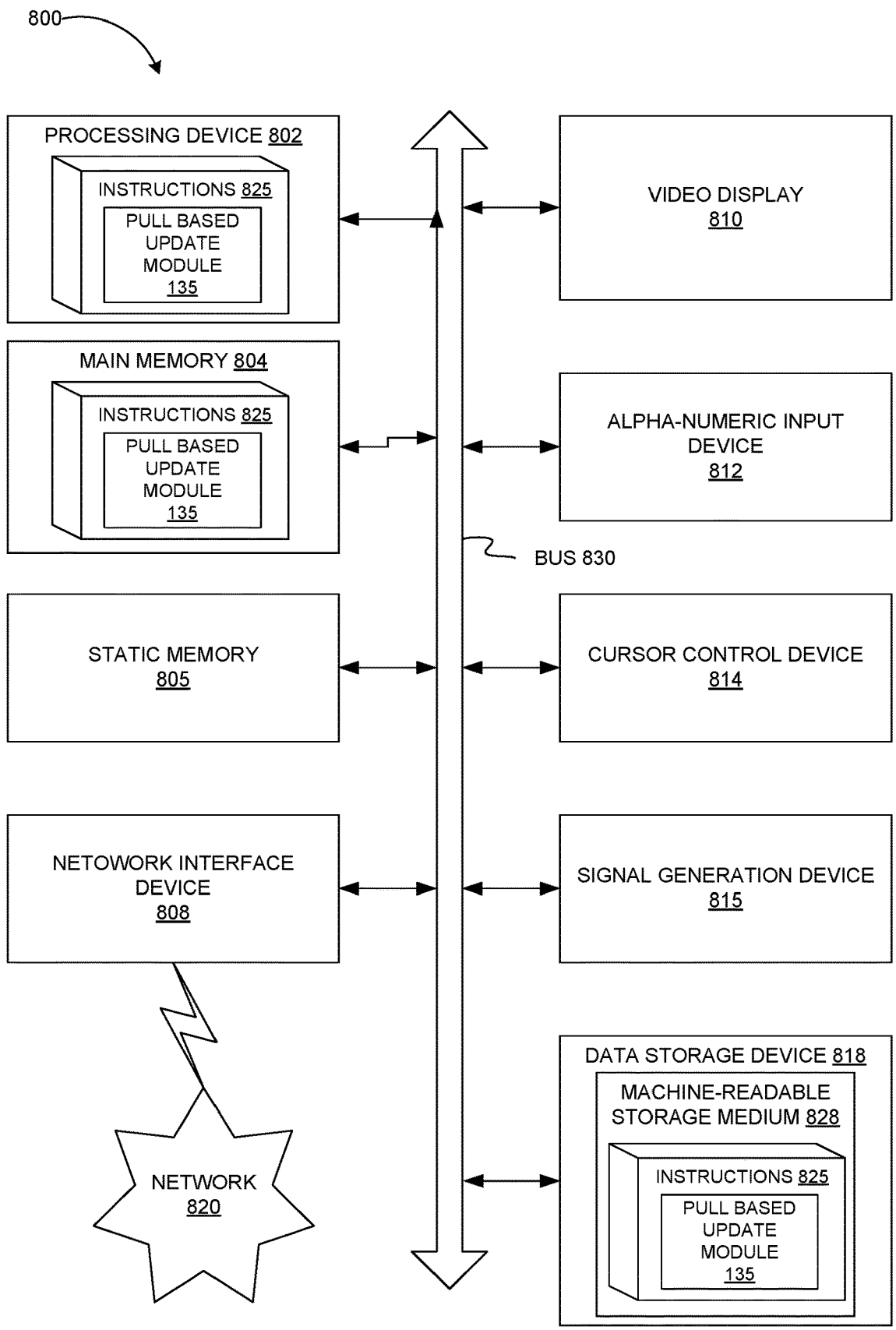
FIG. 8 is a block diagram of an example apparatus that may perform one or more of the operations described herein, in accordance with some embodiments of the present disclosure.

FIG. 8 is a block diagram of an example computing device 800 that may perform one or more of the operations described herein, in accordance with some embodiments. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825 that may include instructions for a pull based update module e.g., pull based update module 135 for carrying out the operations described herein, in accordance with one or more aspects of the present disclosure. Instructions 825 may also reside, completely or at least partially, within main memory 804 and/or within processing device 802 during execution thereof by computing device 800, main memory 804 and processing device 802 also constituting computer-readable media. The instructions 825 may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising determining, by a processing device executing an instance of a service within a computing environment, whether a code update for the service is available at a central repository of the computing environment, in response to determining that the code update is available, retrieving the code update from the central repository, and performing, by the processing device, a modification of the instance of the service in view of the code update.

Example 2 is the method of Example 1, wherein determining whether the code update for the service is available is in response to determining that the instance of the service has been accessed.

Example 3 is the method of Example 1 or Example 2, wherein the computing environment comprises a cluster of host computing devices executing a high performance computing workload.

Example 4 is the method of Example 1, Example 2, or Example 3, wherein the service executes in a container comprising an isolated execution environment.

Example 5 is the method of Example 1, Example 2, Example 3, or Example 4, wherein performing the modification comprises applying the code update to a local file system of the container of the instance of the service without restarting the container.

Example 6 is the method of Example 1, Example 2, Example 3, Example 4, or Example 5, wherein determining whether a code update for the service is available comprises determining whether metadata of the central repository indicates that the code update is stored at the centralized repository.

Example 7 is the method of Example 1, Example 2, Example 3, Example 4, Example 5, or Example 6, wherein the metadata of the central repository comprises a signature of the code updates.

Example 8 is a system comprising a plurality of host machines executing one or more instances of a service for a computing workload, and a central code repository communicatively coupled to the plurality of host machines, the central code repository comprising a processing device to receive modifications to the service, publish the modifications to be available to the one or more instances of the service, and in response to receiving a request to retrieve the modifications from one of the one or more instances of the service, provide the modifications to the instance of the service.

Example 9 is the system of Example 8, wherein the central code repository comprises a continuously running code repository accessible by each of the one or more instances of the service.

Example 10 is the system of Example 8 or Example 9 wherein the modifications to the service comprise one or more code changes for the service pushed to the central code repository from a developer system.

Example 11 is the system of Example 8, Example 9, or Example 10, wherein the processing device is further to provide a notification to each of the one or more instances of the service that the modifications have been pushed to the central code repository.

Example 12 is the system of Example 8, Example 9, Example 10, or Example 11, wherein to publish the modifications, the processing device is to store a signature of the modifications as metadata associated with the modifications, the metadata being accessible by each of the one of more instances of the service.

Example 13 is the system of Example 8, Example 9, Example 10, Example 11, or Example 12, wherein an access location of the modifications comprises a uniform resource locator (URL) of the modifications.

Example 14 is the system of Example 8, Example 9, Example 10, Example 11, Example 12, or Example 13, wherein to store the signature of the modifications as metadata the processing device is to store the signature in a configuration map (configMap) associated with the plurality of host machines and the central code repository.

Example 15 is a non-transitory computer-readable storage medium including instructions that, when executed by a processing device, cause the processing device to determine, by a processing device, that a code update for a service of a computing environment is available at a centralized repository, retrieve, by each of a plurality of instances of the service, the code update from the centralized repository, and update, by the processing device, each of the plurality of instances of the service in view of the code update retrieved from the centralized repository.

Example 16 is the non-transitory computer-readable storage medium of Example 15, wherein the processing device determines that a code update for the service is available at periodic intervals.

Example 17 is the non-transitory computer-readable storage medium of Example 15 or Example 16, wherein to determine that the code update for the service is available, the processing device is to access metadata associated with the central repository, the metadata comprising a signature of the code update; and determine that the signature of the code update indicates that the code update is stored at the central repository.

Example 18 is the non-transitory computer-readable storage medium of Example 15, Example 16, or Example 17, wherein to retrieve the code update from the central repository, the processing device is to download the code update from the central repository to a container associated with each of the plurality of instances of the service.

Example 19 is the non-transitory computer-readable storage medium of Example 15, Example 16, Example 17, or Example 18, wherein the processing device is further to perform a snapshot of each of the plurality of instances of the service prior to updating each of the plurality of instances of the service.

Example 20 is the non-transitory computer-readable storage medium of Example 15, Example 16, Example 17, Example 18 or Example 19, wherein the processing device is further to monitor performance of each of the plurality of instances of the service, and in response to detecting a performance regression of the service associated with the code update, revert each of the plurality of instances of the service to a previous state in view of the snapshot of each of the plurality of instances of the service.

Example 21 is the non-transitory computer-readable storage medium of Example 15, Example 16, Example 17, Example 18, Example 19, or Example 20, wherein to update each of the plurality of instances of the service, the processing device is to apply the code updates to a local file system of a container of each of the plurality of instances of the service.

Example 22 is a method comprising receiving, at a processing device executing a central code repository, code changes to a service associated with a computing environment, storing the code changes to be available to one or more instances of the service executing in the computing environment, receiving a request from the one or more instance of the service to retrieve the code changes, and providing the code changes to the one or more instances of the service for the code changes to be applied to the one or more instances of the service.

Example 23 is the method of Example 22, wherein the computing environment comprises a serverless computing environment.

Example 24 is the method of Example 22 or Example 23, wherein publishing the code changes comprises updating metadata associated with the computing environment to include a signature of the code changes.

Example 25 is the method of Example 22, Example 23, or Example 24, wherein the central code repository is a continuously running code repository accessible from the one or more instances of the service executing in the computing environment.

Example 26 is the method of Example 22, Example 23, Example 24, or Example 25, further comprising performing a snapshot on the computing environment prior to the code changes being applied to the one or more instances of the service.

Example 27 is the method of Example 22, Example 23, Example 24, Example 25 or Example 26, further comprising detecting a performance regression of the computing environment associated with the code changes to the service and in response to detecting the performance regression, reverting the computing environment to the state of the computing environment at the time of the snapshot.

Example 28 is a system comprising a memory, and a processing device operatively coupled to the memory, the processing device to determine that a code update for a service of a computing environment is available at a central repository, retrieve, by a container executing an instance of the service, the code update from the central repository, and update the instance of the service in view of the code update retrieved from the central repository.

Example 29 is the system of Example 28, wherein to update the instance of the service the processing device is to perform a hot reload of the service within the container without restarting the container.

Example 30 is the system of Example 28, or Example 29, wherein the instance of the service is included in a software wrapper for applying the code updates to the instance of the service.

Example 31 is the system of Example 28, Example 29, or Example 30, wherein the computing environment comprises a cluster of computing devices.

Example 32 is the system of Example 28, Example 29, Example 30, or Example 31, wherein the service is associated with a high performance computing workload executing on the cluster of computing devices.

Example 33 is the system of Example 28, Example 29, Example 30, Example 31, or Example 32, wherein the processing device is further to determine that the code update is available at the central repository is performed in response to a triggering event.

Example 34 is the system of Example 28, Example 29, Example 30, Example 31, Example 32, or Example 33, wherein to determine that the code update is available at the central repository the processing device is to determine that the instance of the service has been accessed and in response to determining that the instance of the service has been accessed, determine whether metadata of the central repository indicates that the code updates are stored at the central repository.

Example 35 is an apparatus comprising: means for determining whether a code update for a service associated with an instance of the service executing in a computing environment is available at a central repository of the computing environment, means for retrieving the code update from the central repository in response to determining that the code update is available, and means for performing a modification of the instance of the service in view of the code update.

Example 36 is the apparatus of Example 35, wherein the means for determining whether the code update for the service is available includes means for determining that the instance of the service has been accessed.

Example 37 is the method of Example 35 or Example 36, wherein the computing environment comprises a cluster of host computing devices executing a high performance computing workload.

Example 38 is the method of Example 35, Example 36, or Example 37, further comprising means for executing the service in a container comprising an isolated execution environment.

Example 39 is the method of Example 1, Example 2, Example 3, or Example 4, further comprising means for applying the code update to a local file system of the container of the instance of the service without restarting the container.

Example 40 is the method of Example 1, Example 2, Example 3, Example 4, or Example 5, further comprising means for determining whether metadata of the central repository indicates that the code update is stored at the centralized repository.

Example 41 is an apparatus to perform any one of the methods of Examples 1-7 and Examples 22-27.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    determining, by a processing device executing an instance of a service within a computing environment, whether a code update for the service is available at a central repository of the computing environment, wherein the service executes within a container comprising an update component executing within the container;
    in response to determining, by the update component, that the code update is available at the central repository:
        requesting, by the update component executing within the container of the instance of the service, the code update from the central repository; and
        receiving, by the update component of the container, the code update from the central repository;
    performing a snapshot of each of the instance of the service;
    performing, by the update component of the container executed by the processing device, a modification of the instance of the service in view of the code update without restarting the container;
    monitoring performance of the instance of the service; and
    in response to detecting a performance regression of the service associated with the code update, reverting the instance of the service to a previous state in view of the snapshot of the instance of the service.

2. The method of claim 1, wherein determining whether the code update for the service is available is in response to determining that the instance of the service has been accessed.

3. The method of claim 1, wherein the computing environment comprises a cluster of host computing devices executing a distributed computing workload.

4. The method of claim 1, wherein the service executes in a container comprising an isolated execution environment.

5. The method of claim 4, wherein performing the modification comprises:
    applying the code update to a local file system of the container of the instance of the service without restarting the container.

6. The method of claim 1, wherein determining whether a code update for the service is available comprises determining whether metadata of the central repository indicates that the code update is stored at the centralized repository.

7. The method of claim 6, wherein the metadata of the central repository comprises a signature of the code update.

8. A system comprising:
    a plurality of host machines executing one or more instances of a service for a computing workload, wherein each of the one or more instances of the service executes within a container comprising an update component executing within the container; and
    a central code repository communicatively coupled to the plurality of host machines, the central code repository comprising a processing device to:
        receive modifications to the service;

publish the modifications to be available to the update component of the container for each of the one or more instances of the service, wherein to publish the modifications the processing device is to provide an indication to the update component of the container for each of the one or more instances that the modifications are available to be retrieved by the update component;

perform a snapshot of each of the one or more instances of the service;

in response to receiving a request to retrieve the modifications from the update component of one of the one or more instances of the service, provide the modifications to the update component of the instance of the service, wherein the update component is to perform the modifications on the instance of the service without restarting the container;

monitor performance of the one or more instances of the service; and in response to detecting a performance regression of the service associated with the modifications, revert each of the one or more instances of the service to a previous state in view of the snapshot of each of the one or more instances of the service.

9. The system of claim 8, wherein the central code repository comprises a continuously running code repository accessible by each of the one or more instances of the service.

10. The system of claim 8, wherein the modifications to the service comprise one or more code changes for the service pushed to the central code repository from a developer system.

11. The system of claim 8, wherein the modifications are associated with an access location of the service, and wherein the request to retrieve the modifications comprises the access location of the modifications.

12. The system of claim 8, wherein to publish the modifications, the processing device is to:
store a signature of the modifications as metadata associated with the modifications, the metadata being accessible by each of the one or more instances of the service.

13. The system of claim 12, wherein the signature comprises a checksum of the modifications.

14. The system of claim 12, wherein to store the signature of the modifications as metadata the processing device is to:
store the signature in a configuration map (configMap) associated with the plurality of host machines and the central code repository.

15. A non-transitory computer-readable storage medium including instructions that, when executed by a processing device, cause the processing device to:
determine, by a processing device, that a code update for a service of a computing environment is available at a centralized repository, wherein the service executes within a container comprising an update component executing within the container;

retrieve, by the update component executing within a container for each of a plurality of instances of the service, the code update from the centralized repository, wherein to retrieve the code update, the update component for each of the plurality of instances of the service is to:
request the code update from the centralized repository; and
receive the code update from the centralized repository;

perform a snapshot of each of the plurality of instances of the service;

update, by the processing device executing the update component, each of the plurality of instances of the service in view of the code update retrieved by the update component from the centralized repository without restarting the container;

monitor performance of each of the plurality of instances of the service; and in response to detecting a performance regression of the service associated with the code update, revert each of the plurality of instances of the service to a previous state in view of the snapshot of each of the plurality of instances of the service.

16. The non-transitory computer-readable storage medium of claim 15, wherein the processing device determines that a code update for the service is available at periodic intervals.

17. The non-transitory computer-readable storage medium of claim 15, wherein to determine that the code update for the service is available, the processing device is to:
access metadata associated with the central repository, the access metadata comprising a signature of the code update; and
determine that the signature of the code update indicates that the code update is stored at the central repository.

18. The non-transitory computer-readable storage medium of claim 15, wherein to retrieve the code update from the central repository, the processing device is to:
download the code update from the central repository to a container associated with each of the plurality of instances of the service.

* * * * *